United States Patent [19]
Krude et al.

[11] Patent Number: 5,632,682
[45] Date of Patent: May 27, 1997

[54] OUTER JOINT PART FOR A CONSTANT VELOCITY UNIVERSAL JOINT HAVING INSERTS WHICH FORM ITS GUIDING GROOVES

[75] Inventors: Werner Krude; Dieter Jost, both of Neunkirchen, Germany

[73] Assignee: GKN Automotive AG, Siegburg, Germany

[21] Appl. No.: 411,015

[22] Filed: Mar. 27, 1995

[30] Foreign Application Priority Data

Apr. 2, 1994 [DE] Germany .......................... 44 11 515.6

[51] Int. Cl.⁶ .................................................. F16D 3/20
[52] U.S. Cl. .......................... 464/111; 464/170; 464/905
[58] Field of Search ................................ 464/111, 120, 464/123, 124, 905, 112, 170

[56] References Cited

U.S. PATENT DOCUMENTS

| | | | |
|---|---|---|---|
| 2,926,510 | 3/1960 | Lorean | 464/123 |
| 3,792,596 | 2/1974 | Orain | 464/905 X |
| 4,507,100 | 3/1985 | Doré et al. | 464/111 |
| 4,689,035 | 8/1987 | Orain | 464/124 |
| 4,808,145 | 2/1989 | Mizukoshi | 464/111 |
| 4,978,325 | 12/1990 | Mizukoshi | 464/111 |
| 5,374,219 | 12/1994 | Kohara et al. | 464/111 |
| 5,376,050 | 12/1994 | Krude et al. | 464/111 |

FOREIGN PATENT DOCUMENTS

| | | | |
|---|---|---|---|
| 2523236 | 9/1983 | France . | |
| 3020193A1 | 12/1981 | Germany . | |
| 3628371 | 3/1987 | Germany | 464/111 |
| 4039597 | 6/1992 | Germany | 464/111 |
| 3-216232 | 3/1991 | Japan . | |
| 4-114127 | 4/1992 | Japan . | |
| 1055482 | 1/1967 | United Kingdom . | |
| 2165622 | 4/1986 | United Kingdom | 464/111 |
| 2237618 | 5/1991 | United Kingdom . | |

*Primary Examiner*—Daniel P. Stodola
*Assistant Examiner*—Eileen A. Dunn
*Attorney, Agent, or Firm*—Harness, Dickey & Pierce, PLC

[57] ABSTRACT

An outer joint part consists of a casing in which the axially extending guiding tracks are fitted in the form of inserts. The casing is provided with axially extending continuous recesses which are open towards the inserts. The unique process for manufacturing the outer joint part consists of positioning the inserts within the recesses and holding them in position by welding or by utilizing a pressing operation on the exterior of the casing while simultaneously positioning the inserts using a supporting core.

12 Claims, 5 Drawing Sheets

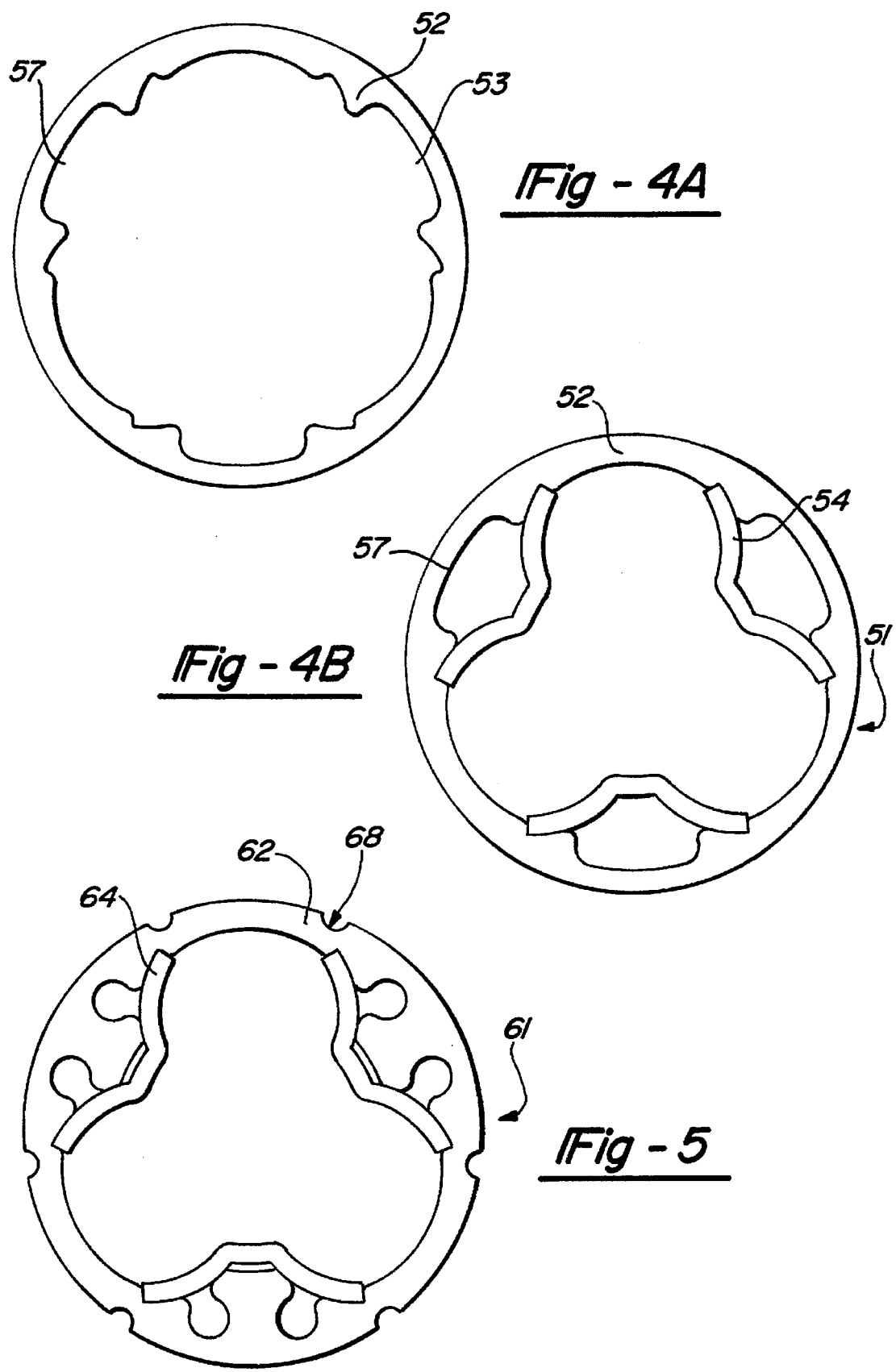

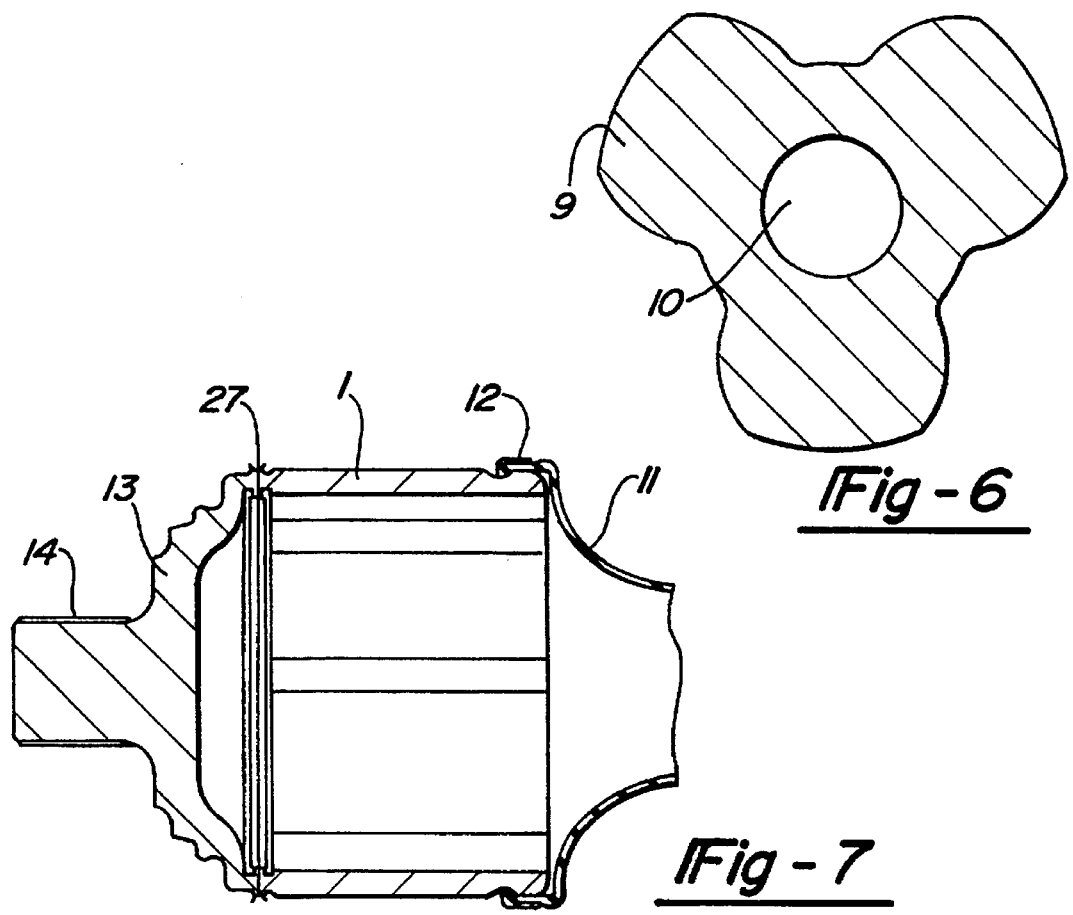
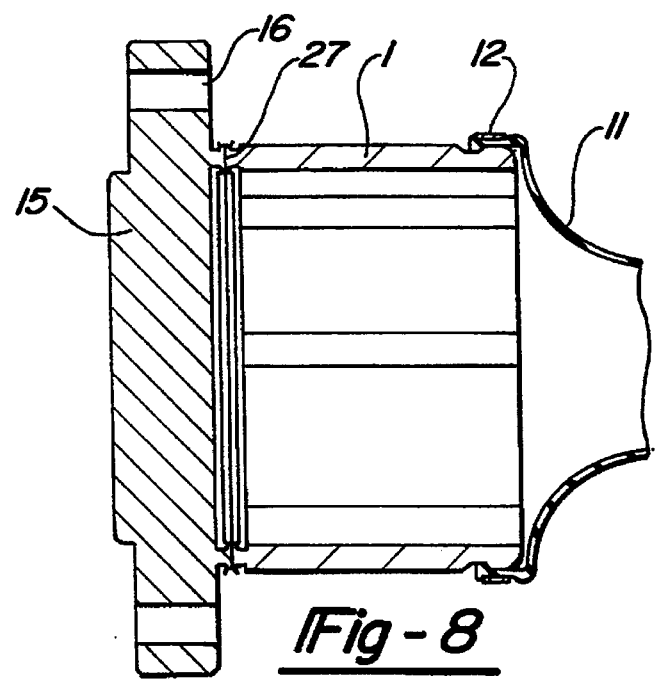

OUTER JOINT PART FOR A CONSTANT VELOCITY UNIVERSAL JOINT HAVING INSERTS WHICH FORM ITS GUIDING GROOVES

FIELD OF THE INVENTION

The present invention relates to an outer joint part for a constant velocity universal joint and a process of producing same. The outer joint part has three axis-parallel guiding grooves each comprising two opposed guiding tracks. The opposed guiding tracks are formed by inserts arranged in the various guiding grooves.

BACKGROUND OF THE INVENTION

For a long time, it has been the objective to reduce the weight of constant velocity universal joints (DE-OS 3020193). The above publication proposed to insert a one-piece insert or divided individual inserts into an outer joint part of a constant velocity universal joint, with the supporting outer joint member consisting of a material with a lower specific gravity than the inserts.

However, the above publication contains no reference as to how to ensure that the inserts are arranged inside the outer joint member so as to be centered relative to one another and, furthermore, so as to be aligned relative to the connecting means, a journal or a flange.

SUMMARY OF THE INVENTION

With reference to the existing state of the art, it is therefore the object of the present invention to provide an outer joint part for a constant velocity universal joint, whose weight has been greatly reduced by design measures and whose inserts are centered accurately relative to one another and to the connecting journal or flange.

In accordance with the present invention, the objective is achieved in that a casing is produced in the form of an extruded profile for the outer joint part. The casing comprises a substantially cylindrical outer circumference having the guiding tracks secured to the inner wall of the casing in the form of finish-formed and finish machined inserts in the radially outer region of the inserts, there are arranged recesses which extend over the entire axial length of the casing and which are open towards the inserts.

The outer joint part embodiment in accordance with the present invention is advantageous in that the weight reducing recesses are arranged inside the casing, in this way, the cylindrical shape of the outer wall is retained and it is ensured that the radially inwardly acting pressing tools apply their forces in a uniform way. The cylindrical shape of the casing is also advantageous for fixing the convoluted boot.

According to an advantageous embodiment of the present invention, it is proposed that the recesses are provided with at least one partially cylindrical region.

With this embodiment, the recesses may simultaneously be used for fixing bolts for establishing a connection with attaching parts.

According to a further characteristic of the present invention, is proposed that the recesses are each provided with a web which is arranged symmetrically relative to their radial center line and which point radially inwardly.

This measure provides partial reinforcement in the region of the apertures.

According to a further embodiment of the present invention the central regions of the inserts are supported radially outwardly by the webs.

Such supporting means enable the inserts, if necessary, to accommodate higher torque values.

According to an advantageous embodiment of the present invention, the inserts are connected to the casing by welding.

According to a further advantageous embodiment of the present invention, the inserts are secured in the casing by being pressed radially inwardly and by simultaneously introducing a supporting core inwardly supporting the casing and the inserts.

This fixing method for the inserts may be applied by utilizing the pressing operation, without involving any additional measures, and in consequence, no additional process-related costs are incurred.

According to one outer joint part embodiment, it is proposed that the outer joint part consists of a casing and inserts secured in an aperture arranged inside the casing. In the radially outer region of the inserts, there are arranged recesses which extend over the entire length of the casing and which are open towards the inserts.

According to a process for producing an outer joint part, it is proposed that the inserts are introduced into the pre-produced casing which is advantageously manufactured by extrusion. During the inwardly directed pressing operation, a supporting core arranged inside the casing provided with inserts is held so as to be aligned relative to the pressing tools.

By aligning the supporting core inside the casing provided with inserts and by centering same relative to the radially inwardly acting pressing tools, the inner contour of the outer joint part is well aligned relative to the cylindrical outer wall of same.

Other advantages and objects of the present invention will become apparent to those skilled in the art from the subsequent detailed description, appended claims and drawings.

BRIEF DESCRIPTION OF THE DRAWINGS

Below, the invention will be explained in greater detail with reference to embodiments illustrated in the drawing wherein:

FIG. 4a shows a casing for an outer joint part with recesses in the shape of an oblong hole;

FIG. 4b shows the casing according to FIG. 4a with introduced inserts;

FIG. 5 shows a casing with recesses provided in the cylindrical outer wall for the application of force by the pressing tools;

FIG. 6 shows a supporting core for pressing the inserts into the casing;

FIG. 7 shows an outer joint part with a base provided with a journal;

FIG. 8 shows an outer joint part with a base provided in the form of a flange;

DETAILED DESCRIPTION OF THE PREFERRED EMBODIMENT

Figure 1A:
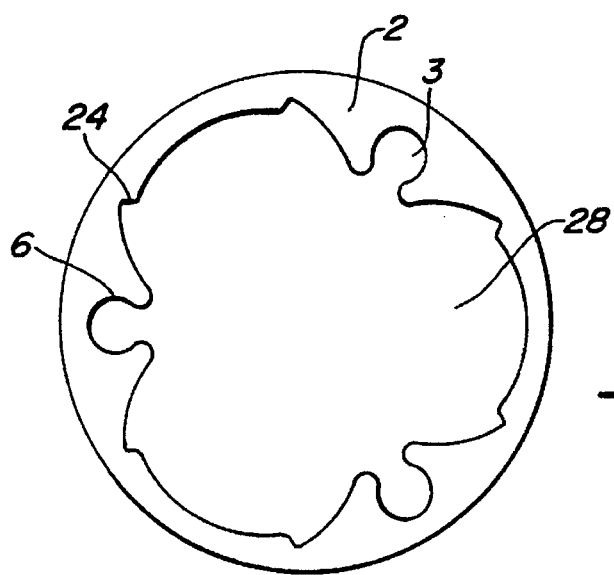
FIG. 1a shows a casing for the outer joint part with a partially cylindrical region of the recesses.
Figure 1B:
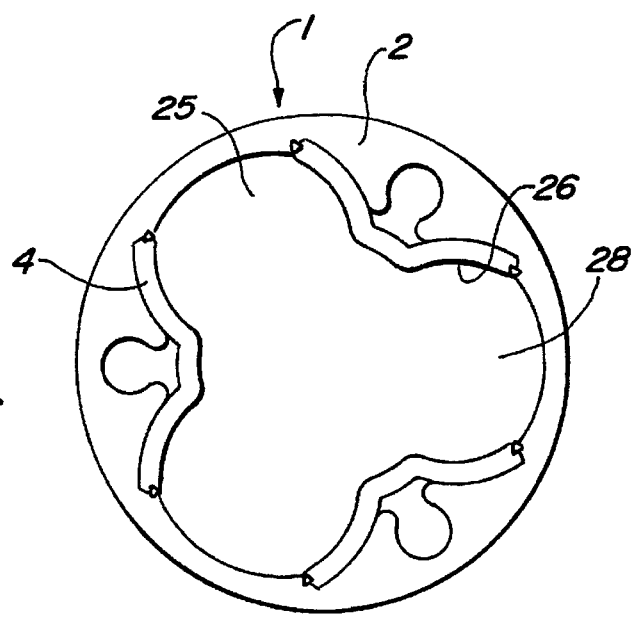
FIG. 1b shows the casing according to FIG. 1a, with inserts secured therein.
Figure 9:
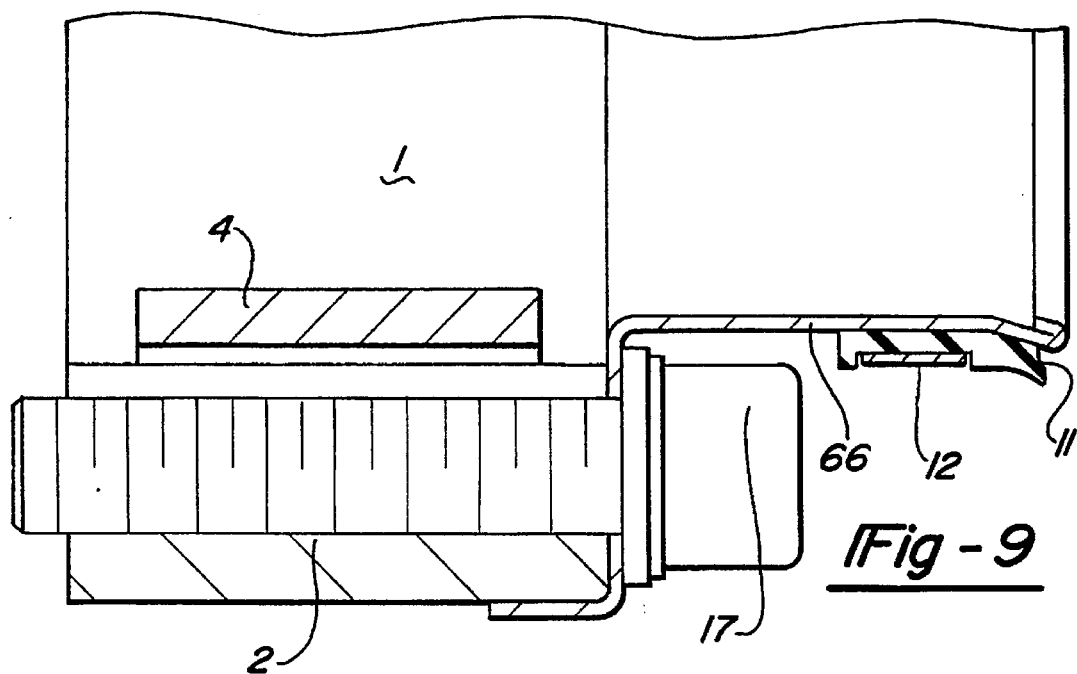
FIG. 9 shows an outer joint part with a threaded connection for securing an attaching part.

Referring now to the drawings in which like reference numerals designate like or corresponding parts throughout the several views, there is shown in FIGS. 1a and 1b, a casing 2 which is provided for an outer joint part 1 in accordance with the present invention. Casing 2 is preferably produced by an extrusion process. An aperture 28 is defined inside casing 2 and aperture 28 is provided with three recesses 3 which each comprise a partially cylindrical region 6. The partially cylindrical region 6 may be used for receiving threaded pins 17 for connecting attaching parts to the outer joint part 1 as shown in FIG. 9.

FIG. 1b shows the complete outer joint part 1 wherein three inserts 4 comprising guiding tracks 26 which, in pairs, form guiding grooves 25 are secured by welding in aperture 28 of casing 2.

Figure 2A:
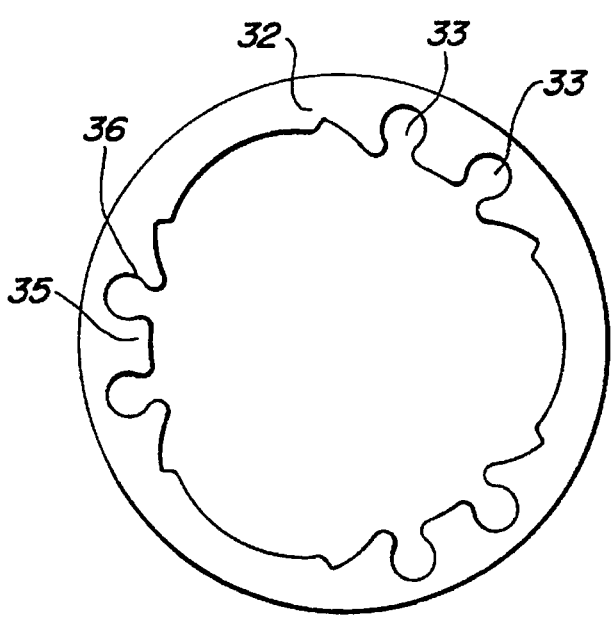
FIG. 2a shows a casing whose recesses are each provided with two partially cylindrical regions.
Figure 2B:
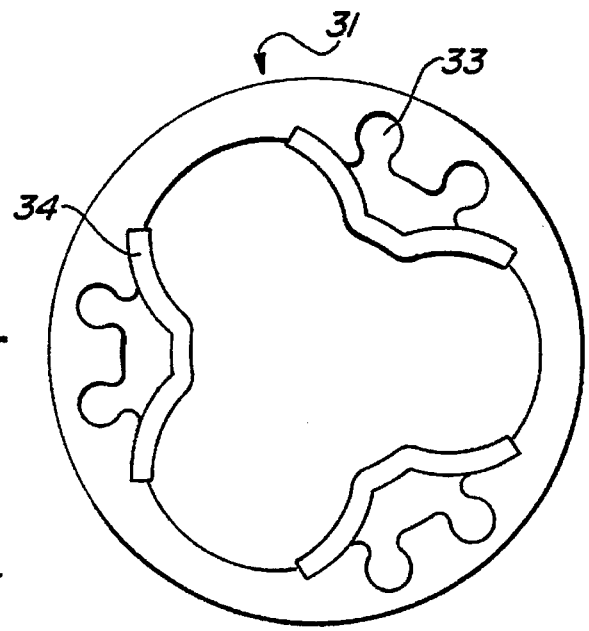
FIG. 2b shows the casing according to FIG. 2a, with inserts received therein.

FIG. 2a shows a casing 32 wherein six recesses 33 are each provided with partially cylindrical regions 36. The partially cylindrical regions 36 are delimited relative to one another by a web 35 arranged therebetween. FIG. 2b shows an outer joint part 31 complemented by three inserts 34.

Figure 3A:
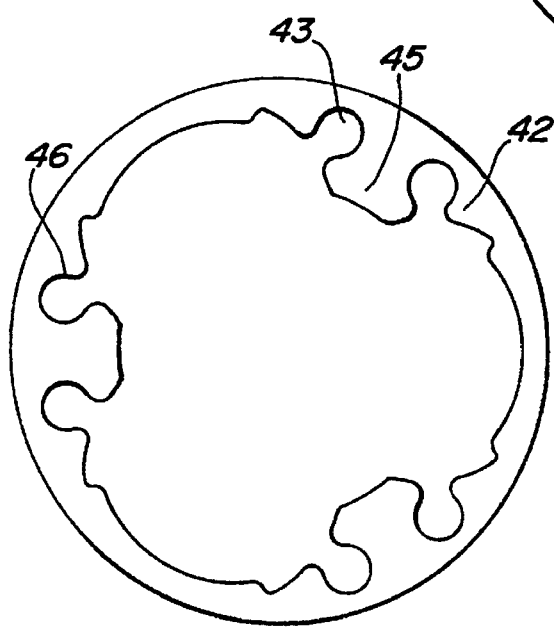
FIG. 3a shows a casing for an outer joint part having a web in the region of the recesses.

FIG. 3a shows a casing 42 wherein, again, each of six recesses 43 is provided with two partially cylindrical regions 46, but as compared to FIGS. 2a and 2b, a web 45 extends radially further inwardly.

Figure 3B:
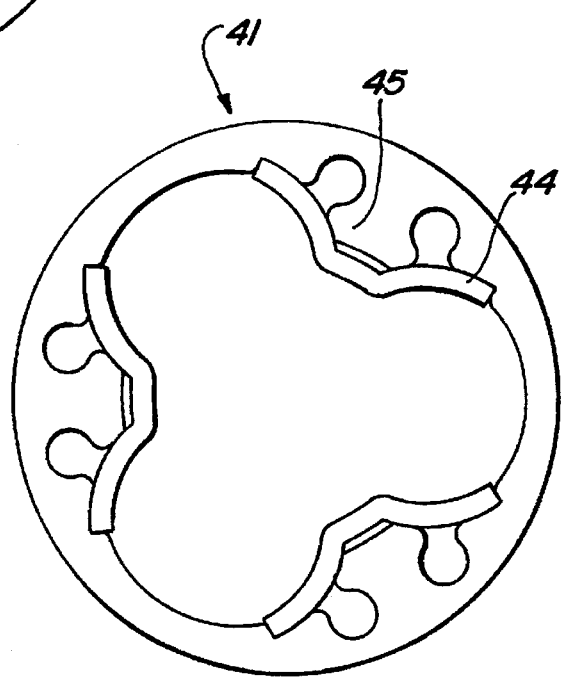
FIG. 3b shows the outer joint part according to FIG. 3a with introduced inserts.

FIG. 3b shows the completed outer joint part 41 with inserts 44. In this case, web 45 is arranged radially inwardly to such an extent that inserts 44 are supported radially outwardly by web 45. As a result of this measure, inserts 44 are able to accommodate a higher circumferentially directed force and thus a higher torque.

FIG. 4a shows a casing 52 wherein three recesses 53 are provided in the form of a radially inwardly opening oblong hole 57.

FIG. 4b shows an outer joint part 51 completed by three inserts 54.

FIG. 5 shows a casing 62 of an outer joint 61 having three inserts 64 whose cylindrical outer wall is provided with a plurality of recesses 68 for the application of force, i.e. for arranging the radially inwardly acting pressing tools (not illustrated). The application of force to the cylindrical outer wall deforms casing 62 so as to embrace inserts 64 to secure them within casing 62.

FIG. 6 shows a supporting core 9 which, during the radially inwardly directed pressing operation, supports casing 62 and inserts 64, shown in FIG. 5. The supporting core 9, in its center, is provided with a centering and fixing bore 10 which accurately positions the inner contour of outer joint part 61 relative to the pressing tools.

FIG. 7 shows outer joint part 1 in accordance with the present invention, having a base 13 which is provided with a plurality of plug-in teeth 14 arranged on a journal. Outer joint part 1 and base 13 are connected by a weld 27 preferably produced by friction welding.

At its end opposed to base 13, outer joint part 1 is provided with a convoluted boot 11 which is secured on the cylindrical outer wall of outer joint part 1 by a tensioning strip 12.

FIG. 8 shows outer joint part 1 which is also connected by weld 27 to a base 15 provided in the form of a flange. Flange-shaped base 15 is provided with threaded holes 16 used for fixing purposes.

FIG. 9 shows outer joint part 1 with fitted inserts 4, with the connection to an attaching part (not illustrated) being effected by threaded pins 17.

The outer joint part shown in FIG. 9 is connected to a covering dish 66 which, in turn, receives convoluted boot 11 secured by tensioning strip 12.

Figure 10:
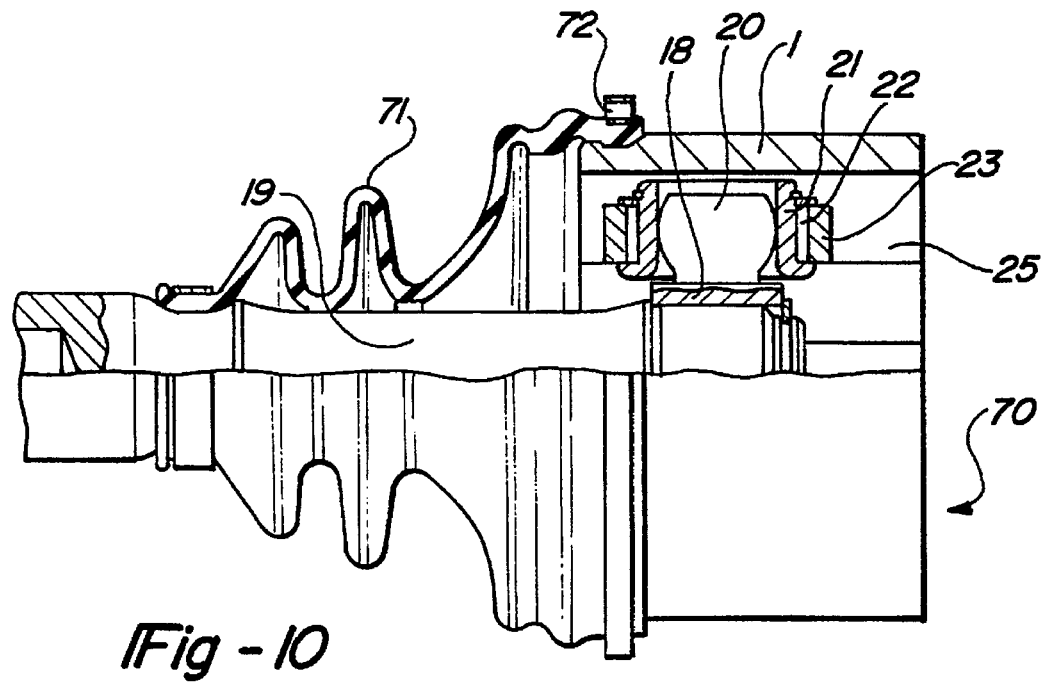
FIG. 10 is a longitudinal section through a complete constant velocity universal joint having an outer joint part in accordance with the present invention.

FIG. 10 shows a complete constant velocity universal joint 70 which substantially consists of outer joint part 1 and an inner joint part 18. Inner joint part 18 is provided with three radially outwardly pointing spherical arms 20 whose arrangement corresponds to that of guiding grooves 25.

On each of the spherical arms 20 there is arranged an inner roller so as to be pivotable and axially movable. An outer roller 23 supported in guiding groove 25 is supported on inner roller 21 by a plurality of needle bearings 22.

By means of a plug-in connection in the form of teeth, inner joint part 18 is connected to a shaft 19 which ensures the transmission of torque. The constant velocity universal joint is outwardly sealed in respect of dust and grease by a convoluted boot 71 which, by means of a tensioning strip 72, is secured to both outer joint part 1 and shaft 19.

While the above detailed description describes the preferred embodiment of the present invention, it should be understood that the present invention is susceptible to modification, variation and alteration without deviating from the scope and fair meaning of the subjoined claims.

What is claimed is:

1. An outer joint part for a constant velocity universal joint, said outer joint comprising:

a casing defining an inner cavity and three circumferentially distributed guiding grooves with a pair of opposed guiding tracks in each guiding groove, said casing having a cylindrical outer circumference; and a plurality of inserts rigidly connected to said casing, said plurality of inserts forming said guiding tracks disposed within said inner cavity, said casing further defining a plurality of recesses, at least one recess disposed between said outer circumference and one of said plurality of inserts to form an open space of circumferentially closed contour between said casing and said insert, respectively, said recesses extending over the entire length of said casing.

2. The outer joint part according to claim 1 wherein, said recesses include a partially cylindrical region.

3. The outer joint part according to claim 1 wherein, said casing includes a plurality of webs, at least one web disposed between adjacent guiding grooves, respectively, said webs extending away from said cylindrical outer circumference into said inner cavity.

4. The outer joint part according to claim 3 wherein, said inserts are supported by said webs.

5. The outer joint part according to claim 1 wherein, said inserts are welded to said casing.

6. The outer joint part according to claim 1 wherein, said inserts are secured form locking to said casing by deformation of said casing.

7. A constant velocity joint comprising:

an outer joint part having a casing defining an inner cavity and three circumferentially distributed guiding grooves with a pair of opposed guiding tracks in each guiding groove, said casing having a cylindrical outer circumference;

a plurality of inserts rigidly connected to said casing, said plurality of inserts forming said guiding tracks disposed within said inner cavity, said casing further defining a plurality of recesses, at least one recess disposed between said outer circumference and one of said plurality of inserts to form an open space of circumferentially closed contour between said casing and said insert, respectively, said recesses extending over the entire length of said casing;

an inner joint part having three arms corresponding to said three guiding grooves, each arm extending into a respective guiding groove; and three roller assemblies, one roller assembly arranged on each arm of said inner joint part, said roller assemblies being disposed between said arms and pairs of opposed guiding tracks, respectively.

8. The outer joint part according to claim 7 wherein, said recesses include a partially cylindrical region, respectively.

9. The outer joint part according to claim 7 wherein, said casing includes a plurality of webs, at least one web disposed between adjacent guiding grooves, respectively, said webs extending away from said cylindrical outer circumference into said inner cavity.

10. The outer joint part according to claim 9 wherein, said inserts are supported by said webs.

11. The outer joint part according to claim 7 wherein, said inserts are welded to said casing.

12. The outer joint part according to claim 7 wherein, said inserts are secured form lockingly to said casing by deformation of said casing.

* * * * *